US008763371B2

(12) United States Patent
Nandyala et al.

(10) Patent No.: US 8,763,371 B2
(45) Date of Patent: Jul. 1, 2014

(54) METHOD FOR OPERATING AN INTERNAL COMBUSTION ENGINE WITH AN SCR CATALYTIC CONVERTER

(75) Inventors: Rajesh Reddy Nandyala, Ditzingen (DE); Andreas Wuest, Stuttgart (DE); Vijay Peter Dhanraj, Russelsheim (DE)

(73) Assignee: Robert Bosch GmbH, Stuttgart (DE)

(*) Notice: Subject to any disclaimer, the term of this patent is extended or adjusted under 35 U.S.C. 154(b) by 443 days.

(21) Appl. No.: 12/690,481

(22) Filed: Jan. 20, 2010

(65) Prior Publication Data
US 2010/0229541 A1     Sep. 16, 2010

(30) Foreign Application Priority Data

Jan. 20, 2009   (DE) .................. 10 2009 000 334

(51) Int. Cl.
*F01N 3/00*  (2006.01)

(52) U.S. Cl.
USPC ............... 60/295; 60/301; 60/277; 701/101; 701/102; 701/123; 701/411; 701/412

(58) Field of Classification Search
USPC ............ 60/295, 311, 277; 701/123, 101, 102, 701/410, 411, 412
See application file for complete search history.

(56) References Cited

U.S. PATENT DOCUMENTS

| 4,813,632 | A | * | 3/1989 | Woodhouse | 244/95 |
|---|---|---|---|---|---|
| 2008/0098726 | A1 | * | 5/2008 | Donaldson et al. | 60/286 |
| 2008/0306631 | A1 | * | 12/2008 | Huang | 700/271 |
| 2009/0217644 | A1 | * | 9/2009 | Jung | 60/276 |
| 2010/0115925 | A1 | * | 5/2010 | Charbonneau | 60/286 |

FOREIGN PATENT DOCUMENTS

| DE | 101 05 175 | 8/2002 | |
|---|---|---|---|
| DE | 101 46 789 | 4/2003 | |
| JP | 2003343240 A * | 12/2003 | ............ F01N 3/08 |
| JP | 2009008074 A * | 1/2009 | |

OTHER PUBLICATIONS

Translation of JP 2003-343240.*
Translation of JP 2009-008074.*

* cited by examiner

*Primary Examiner* — Thomas Denion
*Assistant Examiner* — Patrick Maines
(74) *Attorney, Agent, or Firm* — Kenyon & Kenyon LLP

(57) ABSTRACT

A method for operating an internal combustion engine of a motor vehicle is provided, wherein at least one SCR catalytic converter for the after-treatment of exhaust gases of the internal combustion engine is present. The method serves to assure that a sufficient quantity of reducing agent is supplied for the operation of the SCR catalytic converter. The motor vehicle has a fuel tank (10) with a fill level sensor A (11) and a reducing agent tank (12) with a fill level sensor B (13). Signals from the fill level sensor B (13) or signals from the fill level sensor A (11) and the fill level sensor B (13) are acquired and evaluated by a navigation unit (16).

18 Claims, 2 Drawing Sheets

METHOD FOR OPERATING AN INTERNAL COMBUSTION ENGINE WITH AN SCR CATALYTIC CONVERTER

This application claims benefit of Serial No. 10 2009 000 334.7, filed 20 Jan. 2009 in Germany and which application is incorporated herein by reference. To the extent appropriate, a claim of priority is made to the above disclosed application.

BACKGROUND

The present invention relates to a method for operating an internal combustion engine, having at least one catalytic converter, and thereby for assuring that a sufficient quantity of reducing agent is supplied for the operation of the SCR catalytic converter.

The operation of motor vehicles with internal combustion engines is performed in conjunction with the discharge of toxic emissions. Different measures have already been taken to reduce emissions injurious to health and the environment. The so-called SCR catalytic converter (Selective Catalytic Reduction), which in the presence of a reducing agent reduces the nitrogen oxides contained in the exhaust gas to nitrogen, was, for example, developed to reduce the nitrogen oxides contained in the exhaust gas. During the course of the reaction, ammonia, which is mixed into the exhaust gas, is required. In order to provide the ammonia, a diluted urea solution is employed as a rule, which is injected into the exhaust gas tract upstream from SCR catalytic converter with the aid of a metering unit. The maintenance of this diluted urea solution takes place in a separate reducing agent tank.

For environmental reasons and also on account of governmental regulations, provision must be made for a sufficient quantity of a reducing agent to be present for a proper exhaust gas after-treatment. For this reason, reducing agent tanks with fill level sensors are already known so that the fill level of the reducing agent tank can be displayed; and if need be a filling of the tank with the appropriate reducing agent can be performed at a filling station, respectively a gas station. It is in this case, however, problematic that the driver of the motor vehicle is as a rule not capable of determining to what extent the remaining quantity of reducing agent is sufficient to reach a certain destination and in particular a certain filling station. Furthermore, the driver of the motor vehicle is as a rule not sufficiently informed as to where appropriate filling stations, respectively gas stations, are located, which offer the reducing agent, for example the so-called AdBlue. This can consequently lead to all of the reducing agent in the reducing agent tank being consumed before a filling station has been duly located. In so doing, the operating agent for the SCR catalytic converter is lacking so that a proper exhaust gas after-treatment can no longer take place. As the case may be, the driver of the motor vehicle may be made aware of the situation by means of a fill level indicator for the reducing agent tank. Because the operation of the motor vehicle is, however, nevertheless still possible, the driver may possibly not pay proper attention to the indicator.

With regard to the fuel of a motor vehicle, different approaches already exist for avoiding an unintended emptying of the fuel tank. The German patent application DE 101 05 175 A1 accordingly describes a motor vehicle computer system with a sending unit, a receiving unit and a selection device, wherein the current location data of the motor vehicle are transmitted to a provider when a specified threshold of the tank contents is undershot. Location data and gasoline price data from gas stations, which are located within a predetermined distance to the current position of the motor vehicle, are thereupon received. The German patent application DE 101 46 789 A1 describes a comparable method, wherein the maximum cruising range of the motor vehicle is calculated using a measurement of the quantity of fuel contained in the fuel tank. A routing to a gas station within the cruising range is then performed by a navigation system.

These systems therefore offer the possibility of avoiding an unintended emptying of the fuel tank by punctually directing the driver of the motor vehicle to a gas station via a navigation system. However, an unintended emptying of the reducing agent tank, which supplies the operating means for an SCR catalytic converter, cannot hereby be avoided.

The task underlying the invention is therefore to provide a method and a device, which make it possible to avoid an unintended emptying of the reducing agent tank.

This task is solved by a method and an arrangement for operating an internal combustion engine, as they are described in the independent claims. Preferred configurations, respectively embodiments, thereof are described in the dependent claims.

SUMMARY

The method according to the invention serves to operate an internal combustion engine of a motor vehicle, wherein at least one SCR catalytic converter for the after-treatment of exhaust gases of the internal combustion engine is associated with said internal combustion engine. Provision is made in the method according to the invention for a sufficient quantity of reducing agent for the operation of the SCR catalytic converter to be provided. Provision is made for a reducing agent tank with a fill level sender B in addition to a fuel tank, which as the case may be has a fill level sensor A. According to the invention, the signals from the fill level sensor B or the signals from the fill level sensor A and the fill level sensor B are acquired and/or evaluated by a navigation unit. The signals can also preferably be acquired, relayed and/or evaluated by a central engine control unit and/or a SCR catalytic converter control unit. When navigating the motor vehicle, it is possible with this method to take into account items of information about the fill level of the reducing agent tank in such a way that an appropriate filling station, respectively gas station, can be automatically indicated or a routing to the filling station can be performed when, for example, a critical reducing agent fill level is undershot.

In a preferred configuration of the method according to the invention, further operating parameters are additionally acquired, relayed and evaluated. Preferably the further operating parameters relate to engine rotational speed, speed of the motor vehicle and/or engine operating hours. These operating parameters are advantageously taken into account because they influence the consumption of working materials and in particular of the reducing agent and can therefore play a role in ascertaining the cruising range of the motor vehicle.

In a preferred configuration of the method according to the invention, the reducing agent consumption per quantity of fuel, the reducing agent consumption per unit of engine operating time and/or the engine operating time per quantity of reducing agent are ascertained during the evaluation of the reducing agent consumption per distance driven. This evaluation can, for example, occur in the SCR catalytic converter control unit or in the central engine control unit. The corresponding values can be indicated to the driver of the motor vehicle via a suitable display. These values are preferably used to control navigation via a suitable navigation system. Provision is hereby made according to the invention for the navigation unit and a conventional navigation system to communicate with each other. The cruising range of the motor vehicle is preferably ascertained for the remaining quantity of reducing agent and/or the cruising range of the motor vehicle for the remaining quantity of fuel. A control of the navigation of the motor vehicle can be performed in particular with the aid of these data.

In a particularly preferred embodiment of the method according to the invention, items of information about filling stations, in particular about filling stations providing the reducing agent, are supplied. Such filling stations preferably relate to typical gas stations, which offer the suitable reducing agent, for example the so-called AdBlue, and whereat the tank may be filled with the reducing agent. The filling stations can be deposited in the navigation unit or, for example, are provided with conventional navigation systems by means of data exchange. Appropriate filling stations can be advantageously indicated in a suitable display of a navigation system. It is particularly preferred for suitable filling stations within the cruising range of the motor vehicle to be displayed to the driver of the motor vehicle using the acquired signals from the fill level sensor B or the signals from the fill level sensor A and the fill level sensor B, preferably together with the data ascertained in the course of the evaluation for consumption, engine operating time and/or cruising range of the motor vehicle.

In a particularly preferred embodiment, predeterminable thresholds for the fill level of the fuel tank, the fill level of the reducing agent tank, the cruising range of the motor vehicle, the remaining quantity of reducing agent and/or the cruising range of the motor vehicle for the remaining quantity of fuel are provided. When one or a plurality of these thresholds is undershot, it is particularly advantageous for a corresponding display to occur in order to inform the driver of the motor vehicle. Provided a navigational routing, respectively a corresponding navigation system, was not activated up to this point in time, an activation of said system occurs when one or a plurality of the predeterminable thresholds is undershot so that the driver of the motor vehicle is made aware of the threshold being undershot. It is particularly advantageous for filling stations within the cruising range of the motor vehicle to be displayed when one or a plurality of the predeterminable thresholds is undershot within a suitable indicating range of the navigation unit. The driver of the motor vehicle is placed in a position of being able to drive to one of these filling stations via the display of suitable filling stations within the cruising range of the motor vehicle. When one or a plurality of thresholds is undershot, a navigational routing via a suitable navigation system is particularly advantageous because the driver of the motor vehicle is automatically led to a filling station within said vehicle's cruising range by means of the navigation system. In so doing, provision can be made for the driver of the motor vehicle to be able to select one of the indicated filling stations.

The navigation unit preferably communicates with a conventional navigation system, which leads the driver of the motor vehicle to a certain destination, i.e. in particular to a filling station, via a display and/or via acoustic signals, respectively audible instructions. According to the invention, in particular permanently installed or mobile navigation systems are suited for this purpose, for example: mobile navigation devices, mobile telephones or something similar. When using mobile navigation systems, provision is advantageously made for the motor vehicle to have a standardized interface, for example: USB, Bluetooth or IR, and for the mobile navigation system to likewise be equipped with such an interface. In this way, the mobile navigation system can be used according to the invention through the transmission of applicable signals from the motor vehicle, in particular from the navigation unit, to the mobile navigation system and if need be vice versa.

The invention further comprises a computer program, which can carry out all of the steps of the described method according to the aforementioned embodiments if it is run on a computer or in a control unit. Such a computer program can also be implemented in a navigation system of a motor vehicle. The invention further comprises a computer program product with a program code, which is stored on a machine-readable carrier, for carrying out the described method if the program is executed on a computer or in a control unit.

The invention finally comprises an arrangement for operating an internal combustion engine of a motor vehicle with at least one SCR catalytic converter for the after-treatment of exhaust gases of the internal combustion engine, said arrangement being provided to assure a sufficient quantity of reducing agent is available for the operation of the SCR catalytic converter. In so doing, provision is made for a fuel tank with as the case may be a fill level sensor A and a reducing agent tank with a fill level sensor B. Furthermore, the arrangement comprises a navigation unit and preferably a central engine control unit and/or a SCR catalytic converter control unit for acquiring, relaying and evaluating signals from the fill level sensor B or signals from the fill level sensor A and the fill level sensor B. Items of information about filling stations, in particular filling stations providing reducing agents, are deposited in the navigation unit so that the cruising range of a motor vehicle for the remaining quantity of reducing agent and/or the cruising range of the motor vehicle for the remaining quantity of fuel can be ascertained, and a navigational routing to suitable filling stations within said cruising range can be performed. Predeterminable thresholds for the fill level of the fuel tank, the fill level of the reducing agent tank, the cruising range of the motor vehicle for the remaining quantity of reducing agent and/or the cruising range of the motor vehicle for the remaining quantity of fuel are preferably deposited, for example, in the central engine control unit, in the SCR catalytic converter control unit and/or in the navigation unit. Thus, in the case of one or a plurality of these predeterminable thresholds being undershot, a navigational routing can if necessary be activated; and an automatic directing of the driver of the motor vehicle to a suitable filling station can be performed via a suitable navigation system. With respect to additional characteristics of the arrangement according to the invention, reference is made to the above description.

Additional characteristics and advantages of the invention arise from the subsequent description of the figures in connection with the examples of embodiment. The different characteristics can in each case thereby be individually implemented or in combination with each other.

DETAILED DESCRIPTION

Figure 1:
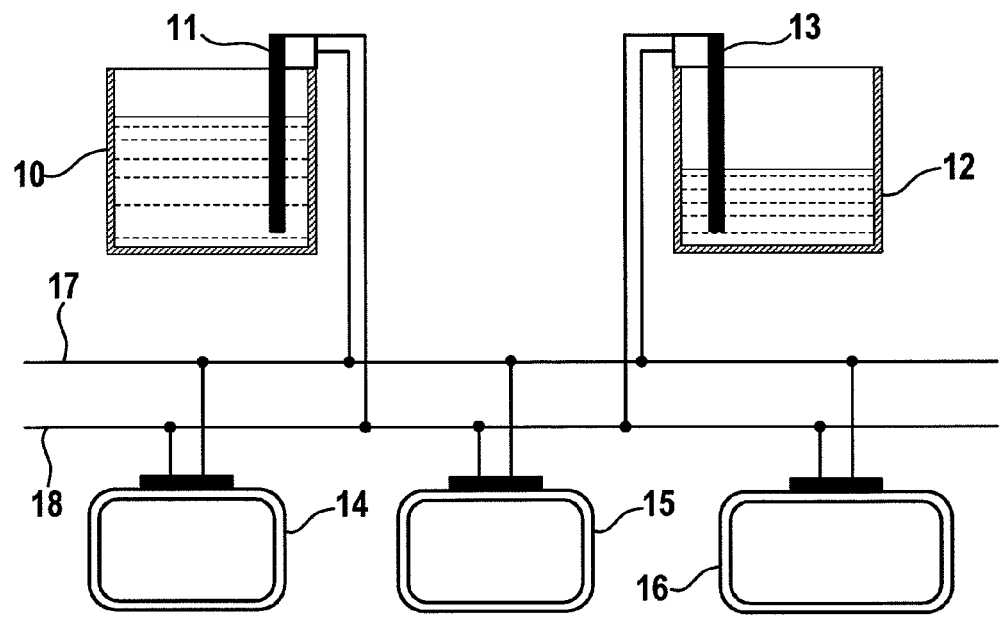
FIG. 1 is a schematic overview for an arrangement with a fuel tank and a reducing agent tank for carrying out the method according to the invention.

FIG. 1 schematically shows an arrangement with a fuel tank 10 and a reducing agent tank 12, wherein the fuel tank 10 is equipped with a fill level sensor 11 (fill level sensor A), which is provided for acquiring the fill level of the fuel. The reducing agent tank has a fill level sensor 13 (fill level sensor B), with which the fill level of the reducing agent present in the tank can be acquired. The sensors 11 and 13 are connected to a central engine control unit 14, a SCR catalytic converter control unit 15 and a navigation unit 16, respectively a navigation control unit, via the conductor paths 17 and 18. The conductor paths can, for example, relate to a conventional networking of the different control devices as it is conventionally done in motor vehicles utilizing, for example CAN H and CAN L.

Provision is made according to the invention for signals from the fill level sensor 13 to be relayed to the navigation unit 16 directly via CAN or indirectly via other units. These signals deliver items of information about the fill level of the reducing agent, for example AdBlue as a diluted urea solution, in the reducing agent tank 12. It is particularly preferred if items of information about the reducing agent fill level as well as items of information about the fuel fill level acquired by means of the fill level sensor 11 are transmitted to the navigation unit 16. As a result of evaluating these signals, respectively these items of information, it is possible according to the invention to control the navigational routing of the motor vehicle in such a way that a suitable filling station, respectively gas station, can be located provided that the reducing agent fill level in the reducing agent tank 12 requires such action.

In addition, these signals are preferably transmitted to the central engine control unit 14, for example, as analogous voltage. It is particularly advantageous for additional operating parameters to be acquired by the central engine control unit 14, in particular the current tachometer values, items of information about the engine operating hours, items of information about the engine rotational speed or other parameters. These items of information are likewise preferably relayed to the navigation unit 16 or, in addition or as an alternative to this, relayed to the SCR catalytic converter control unit 15 and are correspondingly evaluated and processed in the units 15 and/or 16. The signals from the fill level sensor 11 and/or the fill level sensor 13 can likewise be relayed from the central engine control unit 14 to the navigation unit 16 and/or the SCR catalytic converter control unit 15. The reducing agent consumption is preferably determined by the SCR catalytic converter control unit 15, which, as is the case with the central engine control unit 14, likewise preferably relates to a so-called ECU (Electronic Control Unit). Corresponding values can be relayed to the navigation unit 16. On the one hand, the display of the filling stations, i.e. in particular the gas stations, which offer the suitable reducing agent, can take place with the aid of the navigation unit 16. Provision is therefore preferably made for a suitable display. On the other hand, a suitable navigational routing of the motor vehicle can be carried out by means of the navigation unit 16, a conventional navigation system preferably being used for this purpose, which communicates with the navigation unit 16.

Figure 2:
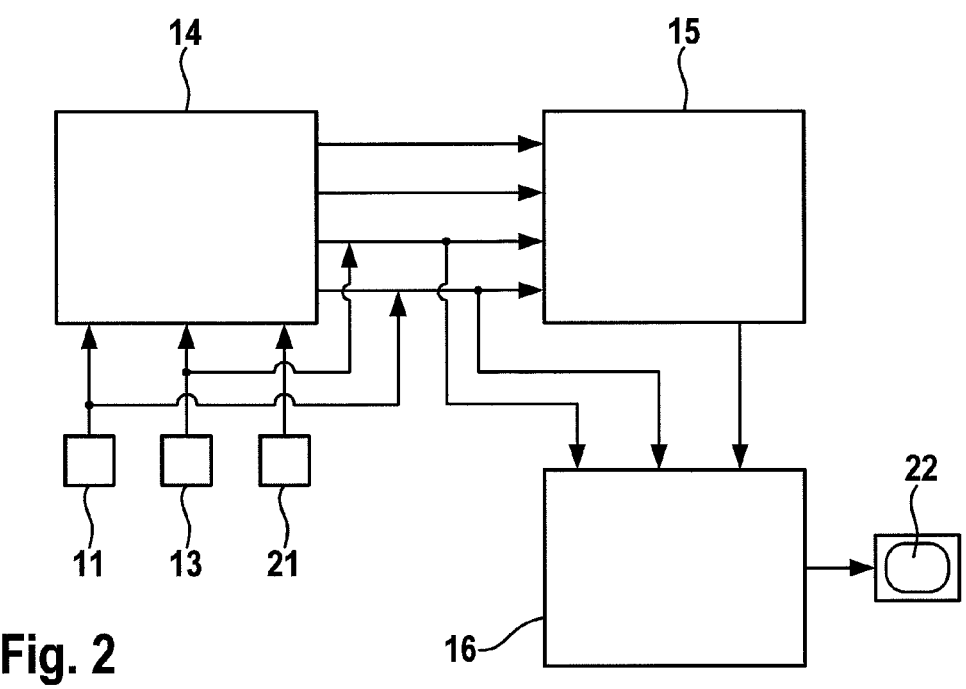
FIG. 2 is a schematic depiction of the interfaces between different control components of a motor vehicle for carrying out the method according to the invention.

FIG. 2 shows an overview of the different interfaces between the individual control units, i.e. between the central engine control unit 14 and the SCR catalytic converter control unit 15 as well as the navigation unit, respectively navigation control unit 16. In this connection, items of information from the fill level sensor A, i.e. from the fuel level sensor 11, are transmitted to the central engine control unit 14. These items of information can also be directly relayed to the SCR catalytic converter control unit 15 and directly or indirectly relayed to the navigation unit 16. Items of information from the fill level sensor B, i.e. from the reducing agent level sensor 13, are relayed to the central engine control unit 14, the SCR catalytic converter control unit 15 and/or the navigation unit 16. Additional operating parameters are forwarded to the central engine control unit 14 and/or the SCR catalytic converter control unit 15. For example, data from an engine revolution counter 21 are forwarded to the engine control unit 14, and/or items of information about the speed of the motor vehicle are forwarded from the central engine control unit 14 to the SCR catalytic converter control unit 15. Furthermore, items of information about the engine operating hours can be forwarded from the central engine control unit 14 to the SCR catalytic converter control unit 15. The different data are evaluated and, for example, the absolute and/or relative reducing agent consumption is ascertained in particular inside the SCR catalytic converter control unit 15. These items of information can be forwarded from the SCR catalytic converter control unit 15 to the navigation unit 16 and can be used to ascertain critical reducing agent filling stations, which lie within the cruising range of the motor vehicle. Appropriate, critical reducing agent filling stations can thus be indicated on a suitable display 22, and/or a navigational routing to a suitable reducing agent filling station can be performed.

The SCR catalytic converter control unit 15 as an electronic control unit can acquire the reducing agent consumption, for example with reference to mileage, for example 0.005 l/km or with reference to the consumption of fuel, for example 0.05 l/l of fuel. The reducing agent consumption can also be ascertained with respect to engine operating hours, for example x liters per operating hour; or the operating hours per liter of reducing agent can be ascertained. One or a plurality of these items of information is preferably relayed via a conventional network, for example CAN, to the navigation unit 16. The critical, respectively reachable, reducing agent filling stations or the nearest ones are calculated by the navigation unit 16 with the aid of these data together with items of information about the reducing agent fill level and preferably the fuel fill level. Provided the navigation unit 16 or a navigation system communicating with it is not activated, the navigation unit 16 or the navigation system can be activated if, for example, the reducing agent fill level drops below a predeterminable threshold.

Provision can be made for different thresholds, which where applicable can be selected by the driver of the motor vehicle. For example, a quantity of reducing agent with respect to the fuel fill level can be selected as a suitable threshold. A quantity of reducing agent can, for example, be specified as a threshold, said quantity being required for driving the given distance, which is achievable with the fuel reserve, which can be predetermined by the manufacturer of the motor vehicle, i.e. the distance which can still be driven when the fuel tank reserve indicator appears. A quantity of reducing agent can additionally be predetermined as a threshold, which would be required for a completely filled fuel tank.

In a further preferred embodiment, the threshold for the quantity of reducing agent can be set with respect to the reducing agent fill level. For example, the threshold can be set at 50% or at 75% filling of the reducing agent tank. An additional threshold can, for example, be predetermined for the case of the reducing agent tank being empty. The quantity of reducing agent, which is required for a planned route that has been, for example, entered via a navigation system as the bearing point, can furthermore be specified as an additional threshold.

Figure 3:
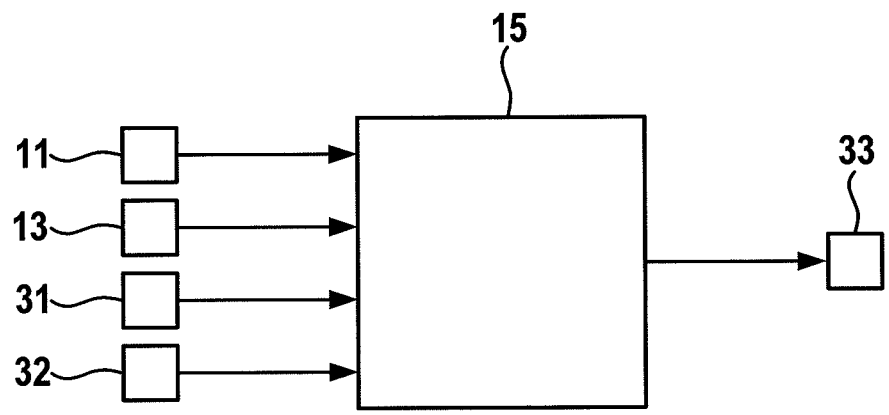
FIG. 3 is a schematic overview for acquiring, relaying and evaluating items of information in conjunction with a SCR catalytic converter control unit in accordance with the method according to the invention

FIG. 3 shows the SCR catalytic converter control unit 15 as a cut-out from FIG. 2 and the various signals, respectively items of information, which can be received by the SCR catalytic converter control unit 15 and, as the case may be, can be processed and forwarded. Items of information concerning the fuel fill level 11, the reducing agent fill level 13, the tachometer 31 and/or items of information concerning the engine operating hours 32 can thus be received by the SCR catalytic converter control unit 15. These items of information can be processed within the SCR catalytic converter control unit 15 so that an expected reducing agent consumption 33 can be calculated. The reducing agent consumption is preferably relayed to the navigation unit. The reducing agent consumption can especially be ascertained with respect to the distance to be traveled, for example per kilometer or per planned traveling distance, or with respect to the fuel or with respect to predeterminable engine operating hours.

The calculation of the expected reducing agent consumption can take place in the following manner: a standard value for the reducing agent consumption per kilometer is initialized as a reference in the data storage unit. The current fill level of the reducing agent is stored after starting travel toward the destination. After arriving at the destination, the difference between the current fill level and the stored fill level is ascertained and divided by the distance traveled. In this way, the reducing agent consumption can, for example, be updated per kilometer. The reducing agent consumption with respect to the distance traveled can likewise be dynamically adjusted in a comparable manner, for example for each kilometer. In this way, the system can adjust the average reducing agent consumption during the driving cycles. This adjustment preferably only then occurs if the reducing agent system, i.e. the SCR catalytic converter system, ran without malfunction during the entire distance traveled. An adjustment of the value for the reducing agent consumption preferably only then occurs in the data storage unit if the currently acquired value is greater than the value, which was previously stored.

The current fuel fill level in the data storage unit upon start-up of the system is, for example, stored for ascertaining the reducing agent consumption with respect to the fuel consumption. After completing a drive, the difference between the current fill level and the stored fill level is calculated. The difference in the reducing agent fill level is ascertained in a comparable manner. The difference in the reducing agent is divided by the difference in the fuel so that the reducing agent consumption can, for example, be calculated per liter. Provision is preferably made in this instance for a predeterminable minimum route to be driven in order to obtain meaningful values. The calculated values can also be updated in a dynamic manner, for example for each kilometer. Updating of the data preferably only then occurs in the main storage by means of the currently calculated values if the calculated value is greater than the stored value.

In order to ascertain the reducing agent consumption with respect to predeterminable engine operating hours, a standard value for the reducing agent consumption per kilometer can be initialized as a reference in the main storage. The current fill level of the reducing agent is stored during start-up. After reaching a destination, the difference between the current fill level and the stored fill level is ascertained and divided by the engine operating hours in order to be able to ascertain the reducing agent consumption per operating hours. For this purpose, provision can be made for a minimum threshold for the engine operating hours to be specified in order to obtain representative values. This calibration is preferably only carried out if the SCR catalytic converter system ran without malfunction during the complete distance traveled. Furthermore, provision is advantageously made for the ascertained, current value for the consumption to only then be updated in the main storage if the currently ascertained value is greater than the previously stored value. The consumption values can likewise be dynamically adjusted, for example at each hour in a comparable manner. In this way, the system can adjust the average reducing agent consumption during the driving cycles. These data can preferably be used for the purpose of verifying the consumption values with respect to the fuel and/or the distance traveled. The items of information can be relayed to the navigation unit as input.

Figure 4:
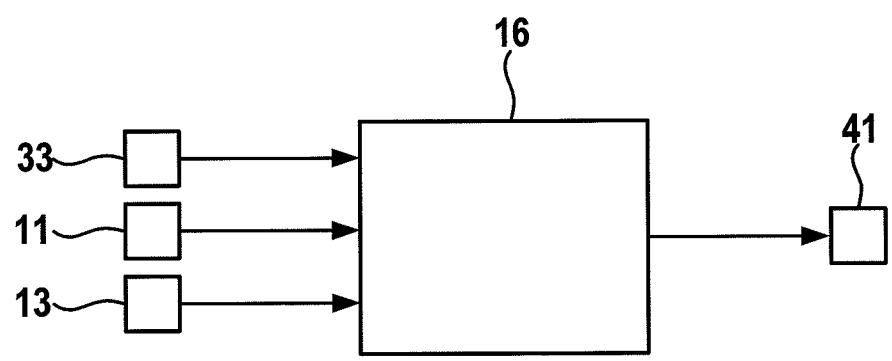
FIG. 4 is a schematic overview for acquiring, relaying and evaluating items of information in conjunction with a navigation unit in accordance with the method according to the invention.

FIG. 4 shows the navigation unit 16 and the various items of information, which are relayed to the navigation unit 16. In particular data with regard to the reducing agent consumption 33 as well as with regard to the fuel fill level 11 and with regard to the reducing agent fill level 13 are relayed to the navigation unit 16. The navigation unit 16 ascertains the critical reducing agent filling stations 41 from said data. The reducing agent filling stations relate to the kind of filling stations, which can be reached with the reducing agent still present in the system, i.e. which lie within the cruising range of the motor vehicle in particular with respect to the reducing agent. Preferably one or a plurality of thresholds is predetermined in order to ascertain the critical reducing agent filling stations. The critical filling stations within the cruising range are ascertained when one or a plurality of these thresholds is undershot.

The cruising range can, for example, be ascertained with respect to the reducing agent. For example, the cruising range can be the distance to be maximally traveled by the motor vehicle, which can be achieved with the current quantity of reducing agent, for example 200 km with 1 liter reducing agent or 400 km with 2 liters reducing agent etc.

In a preferred embodiment of the method according to the invention, the achievable radius of action with respect to the reducing agent can be specified as a reference threshold. For this purpose, the navigation unit 16 utilizes the reducing agent consumption 33 as input with respect to the distance to be traveled, for example liters per kilometer. The difference in the current quantity of reducing agent and the difference in the quantity of reducing agent for a certain, predeterminable radius of action are determined. The distance, respectively route, which can be driven with the quantity of reducing agent currently present in the reducing agent tank, results from the division of the quantity of reducing agent currently present in the tank by the reducing agent consumption per kilometer. The distance ascertained in this manner determines the cruising range of the motor vehicle; and based on the current position of the motor vehicle, filling stations are indicated within this cruising range. The critical filling stations can be marked by colors, numbers or in another fashion on a suitable display. In so doing, darker colors or higher numbers can, for example, indicate such filling stations, which lie in the outlying regions of the cruising range and can only barely be reached with the present quantity of reducing agent.

In another embodiment, the fuel reserve can be specified as a reference threshold, i.e. the quantity of fuel, whereat the driver of the motor vehicle is requested by an indicator, for example a fuel gauge, to fill the tank with fuel. The navigation unit 16 can therefore acquire items of information concerning the reducing agent consumption per liter of fuel as input 1.

This value is used for ascertaining the minimum quantity of reducing agent which is required for the reserve quantity of the fuel. In order to do this, the reserve quantity of the fuel is multiplied by the reducing agent consumption per liter of fuel. The navigation unit 16 acquires the reducing agent consumption in relation to the distance to be traveled as input 2. The critical filling stations are calculated using the difference between the current reducing agent fill level and the quantity of reducing agent, which is required for the reserve quantity of the fuel. The distance, which can be driven with this quantity, is calculated from the difference in the reducing agent fill level multiplied by the reducing agent consumption per kilometer. The cruising range of the motor vehicle results from this calculation. Filling stations for the reducing agent within the calculated cruising range can be indicated from the current position. The filling stations, which can only barely be reached, are, for example, accentuated by the use of darker colors or by certain numbers or other labels.

In a further embodiment, the reference threshold can be the quantity of reducing agent, which is required for the current amount of the available fuel. In this regard, the reducing agent consumption in relation to the fuel can be acquired as input 1 for the navigation unit 16. This item of information is used for determining the minimum quantity of reducing agent in liters, which is required for the current quantity of the available fuel. This can also be calculated by multiplying the current quantity of fuel in liters by the reducing agent consumption per liter of fuel. The reducing agent consumption in relation to the distance traveled is acquired as input 2. The difference between the current quantity of reducing agent and the quantity of reducing agent, which is required for the current quantity of fuel in the tank, is established. The distance, which can be driven with this quantity, is ascertained from this difference in the quantity of reducing agent multiplied by the quantity of reducing agent per kilometer. The filling stations for the reducing agent within the cruising range calculated in this manner are indicated and the filling stations that can only barely be reached can, for example, be specially denoted by colors or corresponding numberings.

In a further embodiment, the quantity of reducing agent, which is required for a completely filled fuel tank, is used as the reference threshold. The reducing agent consumption in relation to the fuel is acquired as input 1. This item of information is used for ascertaining the minimum quantity of reducing agent in liters, which is required for a completely filled fuel tank. In order to do this, the quantity of fuel in liters is multiplied by the reducing agent consumption per liter of fuel. The reducing agent consumption in relation to the distance traveled is acquired as input 2. The difference between the current quantity of reducing agent and the quantity of reducing agent, which is required for a completely filled fuel tank, is established. The cruising range for this quantity is ascertained from the difference in the quantity of reducing agent multiplied by the reducing agent consumption per kilometer. The filling stations for the reducing agent within this cruising range are indicated. In so doing, the filling stations, which can barely be reached, can be specially denoted.

In further embodiments, the critical filling stations can be ascertained as a function of a certain fill level, respectively level of the reducing agent, for example, when the tank is empty or when the reducing agent tank is filled to 40%, 50% or 75%. The reducing agent consumption in relation to the distance traveled (1/km) can thereby be acquired as input 1. The difference between the current quantity of reducing agent and the quantity of reducing agent in liters for a reducing agent tank filled up to a certain percentile proportion or to an absolute proportion is established. The distance, which can be driven with this quantity of reducing agent, is ascertained from the difference in the quantity of reducing agent multiplied by the reducing agent consumption per kilometer. The critical filling stations within this cruising range can be indicated.

In other embodiments, the critical filling stations can be calculated as a function of the reducing agent consumption in relation to the distance to be traveled. In this case, a navigational map can indicate the filling stations for the reducing agent as so-called POIs (Points of Interest), which preferably lie on the planned travel route. The distance in kilometers to the nearest filling station can be indicated at every point in time. The current fill level of the reducing agent is monitored and the reducing agent consumption in relation to the distance to be traveled, for example 1/km, is taken into account. The distance, which the motor vehicle can achieve with the current quantity of reducing agent, is calculated from these two variables, the achievable distance resulting from the current quantity of reducing agent multiplied by the reducing agent consumption per distance to be traveled, for example 1/km. Provided this achievable distance is smaller than the distance to the nearest filling station (POI), the navigation system can be requested to indicate filling stations within the cruising range of the motor vehicle, which lie outside of the planned travel route.

In other embodiments, the calculation of critical filling stations can be based on the reducing agent consumption in relation to the quantity of fuel. In order to do this, the current fuel fill level and the current reducing agent fill level are initially acquired. Furthermore, the reducing agent consumption in relation to the fuel is acquired. The maximum quantity of fuel for the current quantity of reducing agent is obtained by dividing the current quantity of reducing agent by the reducing agent consumption in relation to the fuel. Provided that the maximum quantity of fuel is less than the current quantity of fuel, the nearest filling station, where reducing agent is available, is indicated by the navigation unit.

The filling stations, which are indicated according to the invention, can lie on the desired route and in the direction of travel or within a certain angle in the direction of travel. Provided the reducing agent fill level and also the fuel fill level suggest that replenishing is required, provision can be made according to the invention for a filling station to be able to be selected, whereat the reducing agent as well as the fuel can be refilled.

Provided that it can be assumed that the fuel is not sufficient to reach a filling station, which allows for the replenishing of both the fuel and reducing agent tanks, priority is preferably set on a filling station for replenishing the fuel tank.

When using the method according to the invention with already existing navigation systems, existing mechanisms for locating filling stations can be used in order to locate filling stations for reducing agents.

The invention claimed is:

1. Method for operating an internal combustion engine of a motor vehicle, the method comprising:
   providing at least one SCR catalytic converter for aftertreatment of exhaust gases of the internal combustion engine;
   assuring that a sufficient quantity of reducing agent is supplied for operation of the SCR catalytic converter over a range of the motor vehicle by:
      providing a reducing agent tank with a fill level sensor;
      acquiring signals from the fill level sensor by a location tracking navigation unit; and evaluating the signals from the fill level sensor by the location tracking navigation unit to calculate the range of the motor vehicle;

acquiring signals from a central engine control unit and an SCR catalytic converter control unit;

relaying the signals from the central engine control unit and the SCR catalytic converter control unit to the location tracking navigation unit; and evaluating the signals from the central engine control unit and the SCR catalytic converter control unit by the location tracking navigation unit.

2. The method according to claim 1, further comprising ascertaining reducing agent consumption per route, reducing agent consumption per quantity of fuel, reducing agent consumption per engine operating time unit, and engine operating time per quantity of reducing agent by the location tracking navigation unit.

3. The method according to claim 1, wherein the evaluation is taken into account during a navigation procedure of the motor vehicle.

4. The method according to claim 1, further comprising providing items of information regarding filling stations which provide the reducing agent by the navigation unit.

5. The method according to claim 1, further comprising making a provision for predeterminable thresholds for a fill level of the reducing agent tank and for a cruising range of the motor vehicle for a remaining quantity of the reducing agent.

6. The method according to claim 5, further comprising activating a navigation procedure when at least one of the predeterminable thresholds is undershot.

7. The method according to claim 5, further comprising indicating filling stations within at least one of the cruising ranges by the navigation unit when at least one of the predeterminable thresholds is undershot.

8. The method according to claim 5, further comprising carrying out a navigation procedure to a filling station within at least one of the cruising ranges when at least one of the predeterminable thresholds is undershot.

9. The method according to claim 1, further comprising executing in a control unit a computer program which is stored on a non-transitory computer-readable medium and thereby calculating the range of the motor vehicle.

10. The method according to claim 1, wherein a fuel tank with a fill level sensor A is also provided, wherein the fill level sensor is a fill level sensor B, wherein signals from the fill level sensor A and the fill level sensor B are acquired and evaluated by the location tracking navigation unit to calculate the range of the motor vehicle.

11. The method according to claim 10, wherein the range of the motor vehicle for a remaining quantity of the reducing agent and the range of the motor vehicle for a remaining quantity of fuel are ascertained.

12. The method according to claim 10, wherein a provision is made for predeterminable thresholds for a fill level of the fuel tank, for a fill level of the reducing agent tank, for a cruising range of the motor vehicle for a remaining quantity of the reducing agent, and for a cruising range of the motor vehicle for a remaining quantity of fuel.

13. Method for operating an internal combustion engine of a motor vehicle, the method comprising:
providing at least one SCR catalytic converter for after-treatment of exhaust gases of the internal combustion engine;
assuring that a sufficient quantity of reducing agent is supplied for operation of the SCR catalytic converter over a range of the motor vehicle by:
providing a reducing agent tank with a fill level sensor;
acquiring signals from the fill level sensor by a location tracking navigation unit; and
evaluating the signals from the fill level sensor by the location tracking navigation unit to calculate the range of the motor vehicle;
acquiring an engine rotational speed, a vehicular speed, and engine operating hours;
relaying the engine rotational speed, the vehicular speed, and the engine operating hours to the location tracking navigation unit; and
evaluating the engine rotational speed, the vehicular speed, and the engine operating hours by the location tracking navigation unit.

14. Arrangement for operating an internal combustion engine of a motor vehicle, the arrangement comprising:
a reducing agent tank for holding reducing agent, the reducing agent tank including a fill level sensor;
at least one SCR catalytic converter for after-treatment of exhaust gases of the internal combustion engine;
a location tracking navigation unit;
a central engine control unit; and
a SCR catalytic converter control unit;
wherein signals are acquired from the fill level sensor by the location tracking navigation unit;
wherein a sufficient quantity of the reducing agent supplied for operation of the at least one SCR catalytic converter over a range of the motor vehicle is assured by evaluating the signals from the fill level sensor by the location tracking navigation unit to calculate the range of the motor vehicle;
wherein signals are acquired from the central engine control unit and the SCR catalytic converter control unit;
wherein the signals from the central engine control unit and the SCR catalytic converter control unit are relayed to the location tracking navigation unit; and
wherein the signals from the central engine control unit and the SCR catalytic converter control unit are evaluated by the location tracking navigation unit.

15. The arrangement according to claim 14, wherein items of information regarding filling stations which provide reducing agent are provided and deposited in the location tracking navigation unit.

16. The arrangement according to claim 14, wherein predeterminable thresholds for a fill level of the reducing agent tank, for a cruising range of the motor vehicle, and for a remaining quantity of the reducing agent are deposited in the location tracking navigation unit.

17. The arrangement according to claim 14, wherein the motor vehicle has a fuel tank with a fill level sensor A, wherein the fill level sensor is a fill level sensor B, wherein the location tracking navigation unit evaluates signals from the fill level sensor A and the fill level sensor B.

18. The arrangement according to claim 17, wherein predeterminable thresholds for a fill level of the fuel tank, for a fill level of the reducing agent tank, for a cruising range of the motor vehicle, and for a remaining quantity of the reducing agent and for a cruising range of the motor vehicle for a remaining quantity of fuel are deposited in the location tracking navigation unit.

* * * * *